United States Patent [19]

Kitaura et al.

[11] 4,158,492
[45] Jun. 19, 1979

[54] LIGHT RESPONSIVE CIRCUIT

[75] Inventors: Mashio Kitaura, Tondabayashi; Nobuyuki Taniguchi, Sakai, both of Japan

[73] Assignee: Minolta Camera Kabushiki Kaisha, Osaka, Japan

[21] Appl. No.: 911,050

[22] Filed: May 30, 1978

[30] Foreign Application Priority Data

May 30, 1977 [JP] Japan ................... 52-63749

[51] Int. Cl.[2] ................... G03B 7/08; G03B 15/05
[52] U.S. Cl. ................... 354/24; 354/32; 354/51; 354/60 F; 354/139
[58] Field of Search ................... 354/24, 32, 33, 34, 354/50, 51, 60 F, 139, 145, 149

[56] References Cited

U.S. PATENT DOCUMENTS

| 4,016,575 | 4/1977 | Uchiyama et al. ............... 354/149 X |
| 4,078,242 | 3/1978 | Uchiyama et al. ............... 354/149 X |

Primary Examiner—Michael L. Gellner
Attorney, Agent, or Firm—Watson, Cole, Grindle & Watson

[57] ABSTRACT

A light responsive circuit adapted to measure natural or ambient light and artificial light such as from an electronic flash device, includes a photocell, a logarithmic compression circuit for generating a first output proportional to the logarithm of the light intensity incident on the photocell, a calculation circuit for adding to or subtracting from the first output an electric quantity, such as voltage, which is determined in accordance with a light unrelated input, for example, a film sensitivity setting, thereby generating a second output as a result of the addition or subtraction, a logarithmic expansion circuit for generating a third output proportional to the anti-logarithm of the second output, and an operating circuit responsive to the third output for controlling or indicating at least one camera exposure factor. The light responsive circuit according to the present invention is characterized in that a first control circuit controls or shifts the level of the second output for the same input, in accordance with the light to be measured; and a second control circuit controls the operation of the operating circuit in accordance with the light to be measured, whereby linearity of the logarithmic expansion characteristic is ensured due to the shift of the range of the second output to accommodate the extremely high intensity of the flash light.

16 Claims, 11 Drawing Figures

LIGHT RESPONSIVE CIRCUIT

BACKGROUND OF THE INVENTION

1. Field of the Invention

The present invention relates to a light responsive circuit for generating a light representative output signal which is used for camera exposure control or indication of measured light, and more particularly pertains to a light responsive circuit adapted to measure natural or ambient light and artificial flash light and including a logarithmic conversion circuit.

2. Prior Art

It is known to provide a light responsive circuit with a logarithmic conversion circuit for the convenience of treatment of electric signals. The logarithmic conversion circuit usually consists of a logarithmic compression circuit which is coupled with a photocell and generate an electric signal proportional to the logarithm of measured light intensity, and a logarithmic expansion circuit for generating another electric signal proportional to the signal from the logarithmic compression circuit usually modified while the signal is transmitted. The modification may often be an exposure calculation wherein an electric signal representative of at least one of a number of exposure factors, such as film sensitivity or diaphragm aperture value, is added to or subtracted from the light representative and logarithmically compressed signal from the logarithmic compression circuit. As the compressed signal varies in arithmetical progression whereas the light signal varies exponentially or logarithmically, the electric exposure calculation with the compressed signal requires a considerably narrow range for the electric signals to be treated processed, and also requires only addition and subtraction of signals. This calculation system can be compared to exposure calculation according to the APEX system. Thus such logarithmic conversion circuitry has been popularly used in exposure control circuits with or without a light signal storing means as well as in exposure meters.

It is also known to measure both ambient light and flash light with a common photoelectric circuit provided with a photocell which is highly responsive in a short time to the incident light. Such a light measuring system has been adopted, for example, in an exposure control system wherein a highly responsive photocell disposed in a camera body to receive scene light passing through the camera objective lens and reflected from the focal plane shutter surface and/or film surface is associated with a control circuit which generates a control signal to be delivered not only to a magnetic device for controlling exposure termination but also to a flash control circuit for controlling duration of flash firing. Another example of a device employing such a light responsive circuit may be a flash meter for providing an indication of optimum exposure conditions for flash photography as well as for ordinary photography with ambient light. These common photoelectric circuit systems have merit in that a single photoelectric circuit is commonly used for dual purposes and another photoelectric circuit which otherwise would be required for one of the purposes is not necessary.

Thus, it is appreciated that those skilled in the art may consider employment of a logarithmic conversion circuit in the common photoelectric circuit system. However, this combination involves a serious problem due to characteristics of the semiconductive element included in the conversion circuit.

If the light intensity to be measured is so low as to provide the photocell with very little output, then the logarithmically compressed signal does not accurately correspond to the output of the photocell due to current leakage to the base plate on which the circuit elements are disposed, the affect of bias current on the amplifier for the photocell, nonlinearity of the logarithmic compression element for such low input, the characteristics of the calculation circuit and so forth. However, if the light intensity to be measured is so high as to provide the photocell with a large output, then the input to the logarithmic expansion element will be so high that the output of the expansion element is saturated and its linearity is lost, although the output of the logarithmic compression element has a satisfactory linearity for its high input.

Now, further detailed discussion is presented with respect to the case where the above mentioned light responsive circuit including the logarithmic conversion circuit is employed in an automatic exposure control system in which the output of a control circuit responsive to a single photoelectric circuit is utilized not only for the exposure control but also for the control of flash light duration.

Figure 1:
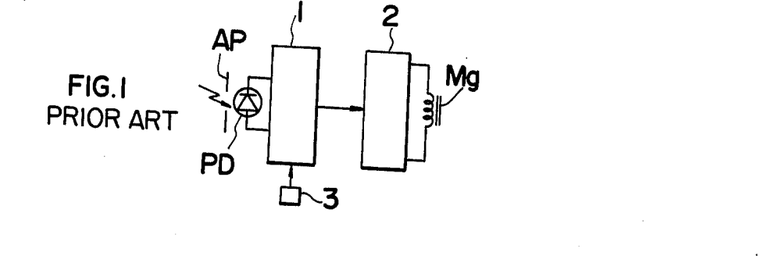
FIG. 1 is a block diagram schematically showing a conventional exposure control system.

Referring to FIG. 1, which shows the general construction of such an automatic exposure control system schematically, photocell PD is disposed within a camera body to receive the light from an object to be photographed, such light passing through the camera objective and the objective diaphragm aperture AP and reflected from the film surface and/or the surface of a focal plane shutter curtain. Alternatively, photocell PD is mounted on the camera body to receive the object light directly through an aperture AP of a light control member interlocked with the objective diaphragm. In both cases, the photocell can receive the object light during shutter operation, i.e. film exposure. Block 1 includes a logarithmic compression circuit for providing a compressed signal proportional to the logarithm of the light intensity incident on the photocell, and a calculation circuit for adding to or subtracting from the compressed signal an electric quantity, e.g. voltage, applied from an exposure factor setting device 3 for providing an electric quantity representative of a set exposure factor such as film sensitivity. Thus the block 1 circuitry generates an output signal as a result of a combination of the compressed signal and the electric quantity, i.e. as a sum of a set exposure factor representative signal and the logarithmically compressed signal, or a remainder of the subtraction therebetween. Block 2 includes a logarithmic expansion circuit for generating an expanded signal proportional to the anti-logarithm of the input signal from the block 1 circuitry, an integrating member for integrating the output of the logarithmic expansion circuit, i.e. the expanded signal, and a threshold circuit for generating a control signal to actuate electromagnet Mg by deenergizing it when the output of the integrating circuit reaches a given threshold level.

If photocell PD is highly responsive to the light incident thereon (a silicon photodiode is known to satisfy such a requirement), the control signal from the block 2 circuitry may also be utilized to control the flash light duration such that a switching element such as a silicon control rectifier (SCR) connected in series with the flash tube is turned off, or a bypass element connected in parallel with the tube is turned on, in response to the control signal so that the flash tube which has been fired in response to shutter opening may be turned off upon the generation of the control signal.

However, such flash control in response to the exposure control signal entails the following problems. The logarithmic expansion circuit ordinarily includes a logarithmic expansion transistor which generates an expanded current that is proportional to the anti-logarithm of its base voltage as an input signal of the block 2 circuitry. The expansion transistor which is included in an integrated circuit loses its linearity between its base-emitter voltage and collector current (expanded current) with the collector current being above 800 μA. (see FIG. 2). Accordingly, when the brightness of an object to be photographed is so high as to require the collector current above that limit, error is likely to be incurred in the exposure control. This will occur frequently in case of flash photography wherein the object to be photographed is illuminated by a flash light of extremely high intensity. However, for the case where the object brightness is very low, and accordingly the expanded current also very low, the lower limit of the expanded current should be about 100 nA so that the leakage current of the integrating member, such as a capacitor, which current is estimated to be several nA, is negligible as compared with the expanded current, i.e. collector current of the expansion transistor. Thus, for the characteristic curve shown in FIG. 2, the range of the collector current available for the exposure control should have an upper limit of 800 μA and a lower limit of 100 nA.

Assuming that the light measuring circuit including the photocell PD, block 1 circuitry and the exposure factor setting device 3, and the exposure control circuit including the block 2 circuitry and the electromagnet Mg are so designed that the expanded currents at the upper and lower limits, i.e. of the value 800 μA and 100 nA, respectively, correspond respectively to 1/1000 second and 8 seconds of exposure time for daylight photography without flash light, then the difference between the output voltages of the light measuring circuit corresponding to the upper and lower limits of the exposure time will be 234 mV.

Figure 2:
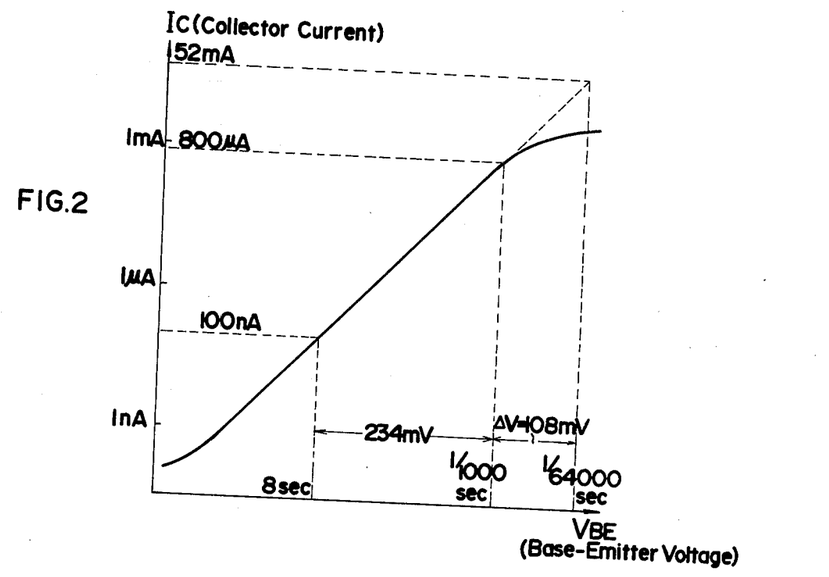
FIG. 2 is a diagram showing the collector current and base-emitter voltage characteristics of a logarithmic expansion transistor.

In case of flash photography, the photocell is to receive light of extremely high intensity so that the minimum time period to be established by the integrating member for controlling the duration while the flash tube is being fired is estimated to be as short as 1/64000 sec. which corresponds to a base-emitter voltage of 108 mV larger than that corresponding to the exposure time of 1/1000 sec. and which requires 52 mA of collector current as determined on the dotted line extended from the linear portion of the real line in FIG. 2. However, the collector current actually obtained for the base-emitter voltage corresponding to the flash light duration of 1/64000 sec., is smaller than 108 mV due to saturation of the collector current as seen on the real line in the range above 800 μA of the collector current in FIG. 2. As a result, the flash light duration will be longer than 1/64000 sec. to cause over-exposure.

SUMMARY OF THE INVENTION

Accordingly, the primary object of the present invention is to provide a light responsive circuit including a photocell, a logarithmic conversion circuit and a control circuit which are commonly used for both daylight or ambient light measurement and flash light measurement, i.e. measurements of the brightnesses of a photographic object illuminated by daylight or ambient light and by flash light, but free from the above problems.

Another object of the present invention is to provide a light responsive circuit adapted to measure brightness of an object to be photographed and illuminated by ambient light and/or flash light, and generate a light representative output which has once been logarithmically compressed and modified or adjusted in accordance with exposure factor setting and then logarithmically expanded without losing linearity even in case of flash light measurement.

Still another object of the present invention is to provide a light responsive circuit selectively settable for a daylight measuring mode and for a flash light measuring mode so that linearity is ensured for both light measuring modes.

To attain these object, the light responsive circuit according to the present invention includes a level shift means for diminishing by a given amount the level of the input to the logarithmic expansion circuit so that the input may be within its linear range, selection means for selectively actuating the level shift means in accordance with whether the photocell receives flash light or not, adjusting means for adjusting the level for operating the control circuit, which is responsive to the output of the logarithmic expansion circuit for controlling the camera exposure and/or exposure indication, so that the operation of the control circuit may be ensured whether the level shift means is actuated or not.

As will be easily understood from the above discussion, the light responsive circuit according to the present invention may be employed in an exposure control circuit which controls not only the exposure time but also the flash light duration without the problems as mentioned above.

Thus, a further object of the present invention is to provide an exposure control system which is free from the above mentioned problems and which controls exposure time and flash light duration by means of a light responsive circuit including the photocell, logarithmic conversion circuit and a control circuit output signal of which is applied not only to the exposure time control magnet but also to the flash duration control circuit.

According to a preferred embodiment of the present invention, in an exposure control system capable of controlling exposure time and flash light duration in accordance with the logarithmically compressed and expanded light representative signal, the logarithmically compressed voltage proportional to the logarithm of a photoelectric current of a photocell is diminished by a given amount in response to completion of preparation for flash firing, i.e. charge-up of a flash energizing capacitor, so that the voltage applied to a logarithmic expansion transistor is within the linear range in the base-emitter voltage to collector-current characteristics of the transistor. The exposure control system further includes a time control circuit. The diminished voltage, being adjusted in accordance with set film sensitivity through an exposure calculation circuit, is then applied to the logarithmic expansion circuit, which generates a current proportional to the anti-logarithm of the input voltage, the current then being applied to a time control circuit. The time control circuit includes a selectable or variable circuit element which is selected or varied in accordance with whether the compressed signal is diminished or not, so that the time control circuit is accomodated for each case and generates a control signal for the exposure time and flash duration control at each appropriate time. The photocell receives the light from the object to be photographed, through a camera objective lens, the diaphragm aperture and reflected from the film and/or focal shutter member surface.

The above and further objects and novel features of the invention will more fully appear from the following detailed description when the same is read in connection with the accompanying drawings.

DETAILED DESCRIPTION OF THE PREFERRED EMBODIMENTS

Figure 3:
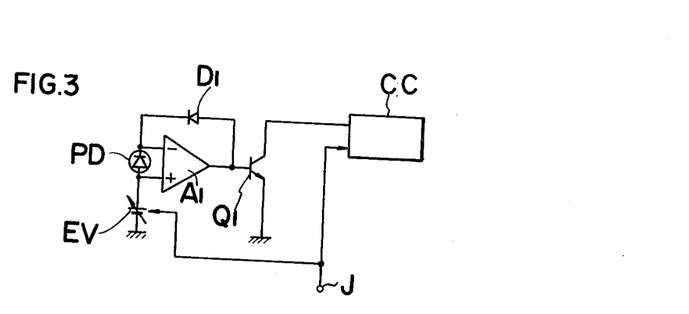
FIG. 3 is a schematic illustration showing the principal elements of the light responsive circuit according to the present invention.

Referring to FIG. 3, which shows schematically the simplified basic construction of the present invention, a photocell PD receiving light from an object to be photographed, directly or through the camera objective and film and/or focal plane shutter surface as the case may be, is connected between a pair of input terminals of an operational amplifier A1 the output of which is fed back through a logarithmic compression diode D1 to one of the pair of input terminals, with the other input terminal being connected to a constant voltage source EV, so that at the output of the amplifier A1 produces a signal representative of the sum of the voltage of the constant voltage source and a voltage proportional to the logarithm of the intensity of light received by the photocell PD. The constant voltage source is constructed such that it generates two voltage levels in accordance with a control signal applied via terminal J. One voltage level EV1 is higher than the other voltage level EV2, by a given amount, with the voltage level being selectable in accordance with an exposure factor setting signal. In other words, the second voltage level EV2 is a voltage shifted by a given amount from the first voltage level EV1.

The output of amplifier A1 is connected to logarithmic expansion transistor Q1 which generates an output current that is proportional to the voltage applied to its base, i.e. the voltage at the output of the amplifier A1. The output current is supplied to a control circuit CC which controls exposure factors such as exposure time, diaphragm aperture or the combination of the two, or controls an indication relating to the light received by the photocell PS, for example, proper exposure time for the measured light. The control circuit CC is also connected to the terminal J through which a control signal is applied to the circuit for changing the latter to the selected voltage EV1 or EV2 of voltage source EV.

Upon measurement of the daylight or ambient light, a first level control signal is applied to the terminal J in accordance with a manual selecting operation or automatic detection of a flash device condition, whereby the constant voltage source EV generates first voltage level EV1 which will be added to the output voltage of the operational amplifier A1. Thus when the circuit of FIG. 3 is actuated, the voltage representing the sum of the first voltage level EV1 and the voltage proportional to the logarithm of the light intensity incident on the photocell PD is applied to the base of the expansion transistor Q1, which in turn generates a current proportional to the anti-logarithm of the input voltage, i.e. logarithmically expanded current. The control circuit CC, then, provides appropriate control in accordance with the expanded current, with the control circuit being so adjusted in response to the first level control signal from the terminal J.

When the flash light reflected by the object to be photographed impinges on the photocell PD, the constant voltage source EV generates second voltage level EV2 in response to a second level control signal from the terminal J. Thus the logarithmic expansion transistor Q1 generates an output current proportional to the anti-logarithm of the voltage sum of the second voltage level EV2 and the voltage proportional to the logarithm of the light intensity incident on the photocell PD. In this case, as the voltage of voltage source EV is shifted to a lower level, the output current of the transistor Q1 is within a linear range in spite of the extremely high intensity of light received by the photocell PD. The control circuit CC, is adjusted by the second level of control signal from the terminal J to properly operate for the shifted voltage the constant voltage source, the exposure or the indication will be controlled appropriately in accordance with the linear output of the expansion transistor Q1.

It may be easily understood from the above that the circuit shown in FIG. 3 can be modified without losing its necessary function. For example, the logarithmic compression circuit and exposure calculation circuit may be as shown in U.S. Pat. No. 3,946,073, 3,971,045 or 3,977,011.

Figure 4:
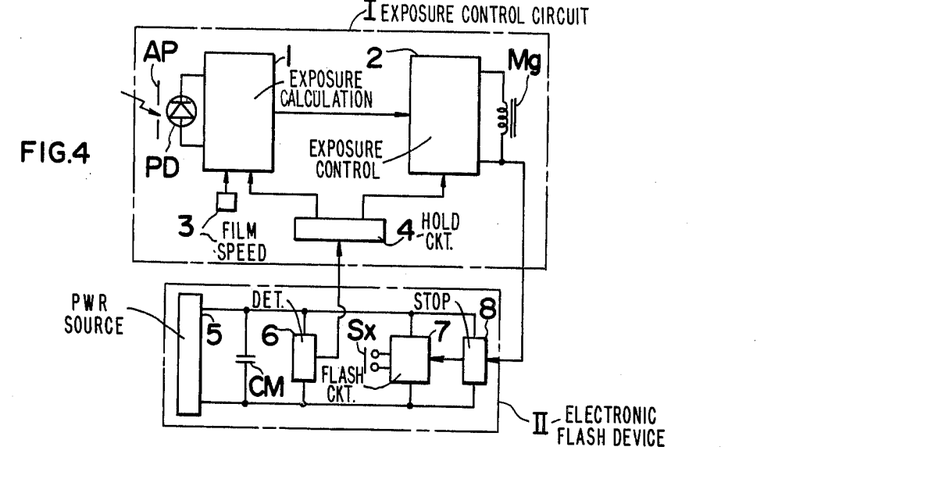
FIG. 4 is a block diagram of an exposure time and flash light duration control circuit according to one embodiment of the present invention.

FIG. 4 is a block diagram illustrative of a circuit for a flash firing device and camera, which incorporates a light responsive circuit according to the present invention. An exposure control circuit I has substantially the same construction as the circuit shown in FIG. 1 except the provision of component 4 and its related circuits. Photocell PD is disposed within the camera body to receive light from an object to be photographed, passing through the camera objective, diaphragm aperture AP and reflected by the surface of the focal plane shutter member and/or the film. In circuit 1 an output current from photocell PD is converted into a logarithmically compressed, voltage signal and an output of a film sensitivity setting means 3 representative of set film sensitivity is electrically added to the voltage signal, as an exposure calculation according to the APEX system, whereby the voltage sum as a result of the addition appears at the output of circuit 1. In circuit 2, the output voltage of circuit 1 is converted to a logarithmically expanded current, which is integrated from the time of the beginning of an opening operation of a camera shutter, and when the integrated voltage reaches a given level, then the magnet Mg is deenergized by a switching circuit, thereby initiating a closing operation of the shutter. A holding circuit 4 generates an output which is changed in response to a signal representing a completion of preparation for flash firing and is fed from the electronic flash device II. Circuit 4 holds the aforenoted output at the changed condition even after the flash firing. In addition, an output voltage of circuit 1 may be lowered in response to the changed output of the holding circuit 4, while a circuit constant contributing to determination of exposure time in circuit 2 may also be changed in response to the output of the holding circuit 4 for the accomodation to the lowered voltage. In electronic flash control circuit II, an electric power source circuit 5 is connected across a main capacitor CM which serves to supply energy to a flash tube. A detecting circuit 6 generates output which is brought to a low level when the charge voltage in main capacitor CM remains below a given level, while the aforesaid output is brought to a high level when the charge voltage of main capacitor CM reaches or exceeds the given level, with the output of the circuit 6 being impressed on the holding circuit 4 and held therein. The reason why the output of detecting circuit 6 is not applied directly to circuits 1 and 2 is that the high level output from the detecting circuit 6 must continue to be applied to such circuits even after initiation of flash firing which lowers the charge voltage in main capacitor CM, because the time control is being carried out during the flash firing. A synchronizing switch SX is adapted to be closed in synchronious with completion of an opening operation of a shutter and to be opened upon starting of a closing operation of the shutter. A flash firing circuit 7 including therein the flash tube is controlled by a stop circuit 8 which interrupts the flash firing in response to the output signal from circuit 2 for de-energizing electromagnet Mg.

Upon daylight photography with the above described arrangement, main capacitor CM in electronic flash control circuit II is not charged, so that the output of detecting circuit 6 remains at a low level, while circuit 1 generates a voltage signal to provide an expanded current of 100 μA when the object brightness is the value for which 8 second of exposure time is suitable in terms of set aperture and film sensitivity. An expanded current of 800 μA is provided, when the object brightness is the value for which 1/1000 second of exposure time is suitable, with the result that the exposure time control circuit affords exposure times of 8 and 1/1000 seconds for the aforementioned expanded currents, respectively.

Upon flash photography, when the charge voltage of main capacitor CM in flash circuit II reaches a given level, then the output of detecting circuit 6 is brought to a high level, so that the holding circuit 4, retaining the high level, transmits the output to circuit 1 to lower the output voltage of the latter by a given amount from that for daylight photography and at the same time to circuit 2 to change the circuit constant therein, such as a resistance, for providing the reference level, capacity of the integrating circuit. According to the aforementioned operation, an output voltage of circuit 1, for instance, corresponding to the shortest flash firing duration of 1/64000 second, is lowered by 108 mV, as compared with the maximum voltage for daylight photography, while an expanded current corresponding to the aforementioned output voltage is maintained at 800 μA. (see FIG. 2). Nevertheless, circuit 2 provides a firing time of 1/64000 second in accordance with the integration of the expanded current of 800 μA, due to the change of the circuit constant. As has been described earlier, the change of the circuit constant in circuit 2 may be due the change of a capacity of an integrating capacitor, a base-emitter junction area in an expansion transistor, a switching level in a switching circuit or the like. Returning to the flash photography operation, the output voltage of circuit 1, which has been lowered by a given amount as compared with the voltage for daylight photography, is expanded in circuit 2 and then starts being integrated upon initiation of a shutter opening operation, while synchronizing switch Sx is closed upon completion of the opening operation of the shutter to thereby trigger flash firing. Then, photocell PD receives the flash light reflected from an object to be photographed while in circuit 2 integration of the expanded current is continued until the integrated value reaches a given value. Then, the switching circuit in circuit 2 is inverted, thereby deenergizing magnet Mg, and then allowing the start of a closing operation of the shutter. Simultaneously therewith, an inverted output signal from the switching circuit is delivered to the stop circuit 8 to interupt flash firing. When the firing circuit 7 in flash circuit II starts to initiate flash firing, then the charge voltage of main capacitor CM is lowered from the given level, and the output of detecting circuit 6 changes from a high to a low level. However, the holding circuit 4 holds the high level output of detecting circuit 6, so that circuits 1 and 2 are by no means returned to the daylight photography conditions simultaneously with the firing. The duration of holding by the holding circuit 4 need only cover up to the completion of a closing of the shutter or the completion of the desired firing action of the flash-firing device.

Meanwhile, in case the shutter begins to be closed before the completion of its opening operation synchronizing switch Sx remains open thereby precluding flash-firing.

Figure 5:
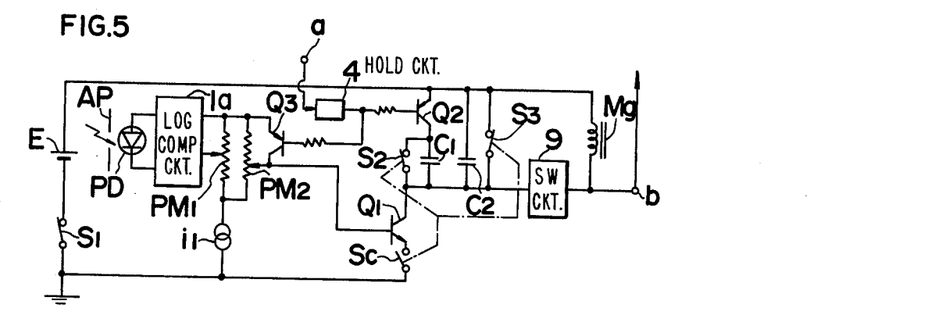
FIG. 5 is a circuit diagram of an exposure control circuit including a level shift circuit and a circuit constant changing circuit according to the present invention.

FIG. 5 shows more concretely an exposure control system according to one embodiment of the invention, which is to be provided in a camera body. An electric power source E is connected to a power switch S1 adapted to be closed in response to shutter release and opened upon completion of exposure. A photocell PD, which receives the object light through a diaphragm aperture AP is connected to a logarithmic compression circuit 1a, the output of which is connected with a slidable contact of a potentiometer PM1 adapted to add a voltage representative of a set a film sensitivity, with a given amount of current flowing therethrough from a constant current source il. Potentiometer PM1 and constant current source il form a film sensitivity-setting circuit 3 as shown in FIG. 1 or 3. The slidable contact of potentiometer PM1 is moved in accordance with the film-sensitivity setting to provide the film sensitivity information. A potentiometer PM2 parallelly connected with potentiometer PM1 produces, between its upper end terminal and its sliding contact, a voltage which is to be subtracted from the voltage at the upper terminal of potentiometer PM1 as the sum of the film sensitivity signal and the logarithmically compressed signal. In the case of daylight photography, however, a transistor Q3, which is positioned between the sliding contact and the upper terminal of potentiometer PM2 remains conductive as will be described hereinafter, so that the output voltage at the output terminal of the light measuring circuit i.e. the voltage at the upper terminal of potentiometers potentiometer PM1 and PM2 may be delivered via transistor Q3 without any modification to the base of a logarithmic-expansion transistor Q1. A counting switch Sc connected with the emitter of the transistor Q1, is adapted to be closed in response to the initiation of an opening operation of the shutter. To the collector of the transistor Q1 are connected integrating capacitors C1 and C2, across which are respectively connected switches S2 and S3 adapted to discharge capacitor C1 and C2, and to be opened upon the starting of an opening operation of the camera shutter. A transistor Q2 connected in series with capacitor C1 remains conductive, thereby establishing a parallel connection for capacitors C1, C2 in the case of daylight photography, for the reasons to be described later. Switching circuit 9 is so designed as to be inverted to de-energize electromagnet Mg when the charge voltage at integrating capacitors C1, C2 reaches a given level. A holding circuit 4 as shown in FIG. 4 has its terminal a connected to the output terminal of circuit 6 of the same Figure. For flash photography, when the main capacitor (CM in FIG. 4) is charged to a given voltage level, then the potential at terminal a is brought to a high level, which level is held by the holding circuit 4 and applied by the same to transistors Q2 and Q3 thereby blocking transistors Q2 and Q3. However, for daylight photography, the output of the holding circuit 4 remains at a low level, so that transistors Q2 and Q3 are maintained conductive. When transistors Q2 and Q3 are blocked in the case of flash photography, then a voltage which is lower by an amount depending on the position of the sliding contact of potentiometer PM2, than the output of the calculation circuit 1, i.e. the potential at the upper terminal of potentiometer PM1, is impressed on the base of logarithmic-expansion transistor Q1. Additionally, since transistor Q2 remains non-conductive at this moment, capacitor C2 alone remains operable, with the result that the capacity for the integration is changed over to a lower level. For instance, assume that for daylight photography, an expanded current corresponding to the exposure time of 1/1000 second is 800 μA, and an expanded current corresponding to the exposure time of 8 second is 100 nA, and that the switching circuit 9 is to be inverted when the integrating capacitors C1 and C2 are charged to 1 V, then the composite capacity of the parallelly connected capacitors C1 and C2 is 0.8 μF. For achieving the flash firing duration of 1/64000 second, which corresponds to the expanded current of 800 μA, the capacity of capacitor C2 alone need only be 1/6 of the aforementioned 0.8 μF, i.e., 0.0125 μF. As can be seen from FIG. 2, the voltage between the upper end of potentiometer PM2 and the sliding contact thereof should be 108 mV. Also, potentiometer PM1 may also be used as an adjusting resistor which serves not only for the film sensitivity signal generation but also for compensation for the variation in the saturating characteristic of transistors Q2 and Q3, as well as for a variation in capacity of capacitors C1 and C2. Furthermore, potentiometer PM2 may also be used for compensating for a variation in capacity of capacitor C2. Meanwhile, a resistor may be positioned between capacitor C2 and electric power source E for the purpose of compensating for a time lag in switching by the switching circuit 9.

Figure 6:
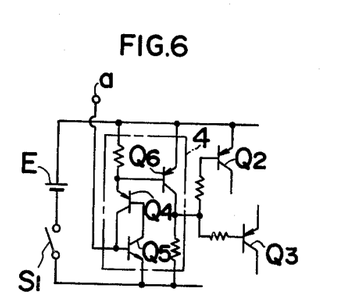
FIG. 6 is a detailed illustration of an embodiment for component 4 in FIG. 5.

FIG. 6 shows the example of the holding circuits to be used for holding circuit 4 in FIGS. 4 and 5. In this Figure, like parts are designated by like reference numerals for the common use with those given in FIG. 5. Transistors Q4 and Q5 constitute a self-maintaining or holding circuit, in which when the potential at terminal a remains at a low level (0 potential), transistors Q4 and Q5 are non-conductive, and when the potential at the terminal a is brought to a high level, then transistor Q5 is made conductive, so that transistor Q4, as well, becomes conductive. However, once such a condition takes place, transistor Q5 remains conductive and so does transistor Q4, even if terminal a is brought to a low level, because base current continues to be supplied from the collector of transistor Q4 to the base of transistor Q5. This condition continues until power source switch S1 is opened. When the transistor Q4 remains non-conductive due to the low level at terminal a, transistor Q6 is also non-conductive, so that the potential at the collector of transistor Q6, as well, remains at a low level, whereby transistors Q2 and Q3 both remain conductive. When the potential at terminal a is brought to a high level to make transistor Q4 conductive, then transistor Q6 becomes conductive with the collector of transistor Q6 being brought to a high level, so that transistors Q2 and Q3 are blocked. Transistors Q4 and Q5 may be replaced by thyristers.

Figure 7:
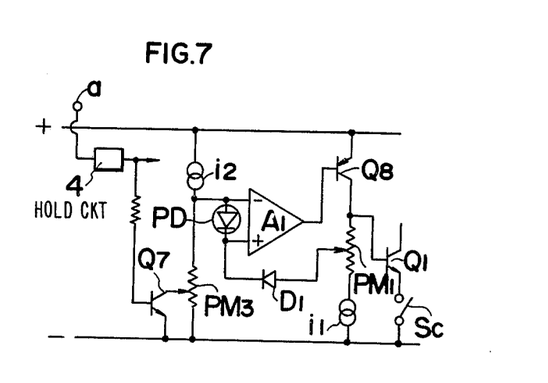
FIG. 7 is a circuit diagram showing another embodiment of the level shift circuit.

FIG. 7 shows another example of the output shiftable light measuring circuit, which consists essentially of operational amplifier A1, photocell PD connected between the inversion and non-inversion input terminals of the amplifier, and a negative feedback circuit including a transistor Q8, potentiometer PM1 and a logarithmically-compressing diode D1. The non-inversion input terminal of operational amplifier A1 is connected to one terminal of potentiometer PM3, to which a constant current is supplied from a constant current source i2, with the result the potential at the non inversion input terminal is maintained constant. The voltage between the inversion and non-inversion input terminals of amplifier A1 remains almost at zero due to the negative feedback through transistor Q8 and diode D1, while the light representative output voltage from the amplifier A1, to which has been added the film sensitivity, appears at the collector of transistor Q8, and is then impressed on the base of expansion transistor Q1. Transistor Q7 serves to shortcircuit a part of the resistance of potentiometer PM3, so that for daylight photography the output of holding circuit 4 remains at a low level, and transistor Q7 remains non-conducting. However, for flash photography, when an output of the holding circuit 4 becomes high, transistor Q7 becomes conductive, to lower the potential at the non-inversion input-terminal of operational amplifier A1, thereby lowering the light measuring output. The voltage to be lowered, or the decrement of voltage, is set to, for instance, 108 mV. Potentiometer PM3 may also be used for compensating for a variation in capacity of capacitor C2 in FIG. 5.

Figure 8:
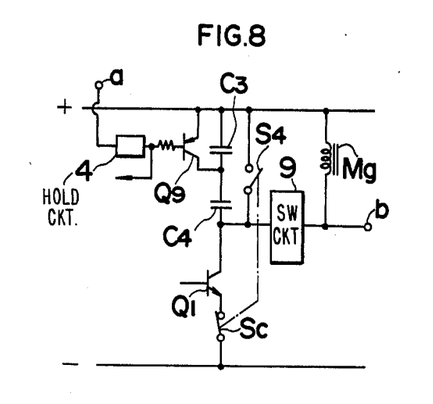
FIG. 8 is a circuit diagram showing another example of the circuit constant changing circuit.

FIG. 8 shows another exemplary circuit for use in changing over the capacity of the integrating capacitor. Unlike the case given in FIG. 5, two integrating capacitors C3 and C4 are connected in series with each other. For daylight photography, transistor Q9 remains conductive and capacitor C3 is shortcircuited, and the capacity of the integrating capacitor depends on the capacity of capacitor C4 alone. For flash photography, transistor Q9 is blocked, so the integrating capacity is the resultant capacity of the serially connected capacitors C3 and C4, and thus becomes lower than that of capacitor C4 alone. Switch S4 is a switch for short-circuiting capacitors C3 and C4 and corresponds to switches S2 and S3 in FIG. 5. Assuming that for the daylight photography the expanded current from transistor Q1 is 800 μA for achieving 1/1000 second of exposure time, and that switching circuit 9 is inverted with the voltage across the series connection of capacitors C3 and C4 (only C4 being effective for daylight photography) being IV, then the capacity of capacitor C4 alone is 0.8 μF, while the resultant capacity of serially connected capacitors C3 and C4 is 0.0127 μF for achieving 1/64000 second of flash duration with an expanded current of 800 μA. Accordingly, the capacity of capacitor C3 is 0.0127 μF. With the aforementioned arrangement, the two switches S2 and S3 are replaced by a single switch S4.

Figure 9:
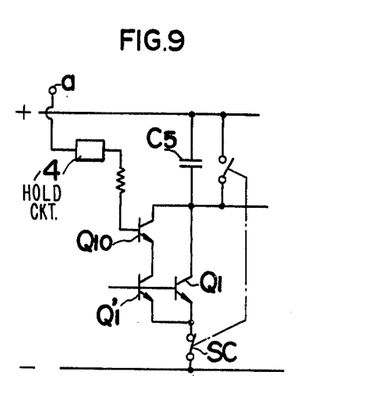
FIG. 9 is a circuit diagram showing a third example of the circuit constant changing circuit.

FIG. 9 shows another arrangement for changing or adjusting the switching characteristics of the exposure control circuit, in which a base-emitter junction area of a logarithmic expansion transistor is changed in accordance with the light to be measured. The logarithmic expansion circuit comprises two logarithmic expansion transistors Q1 and Q1'. Transistor Q1 is directly connected to an integrating capacitor C5, and transistor Q1' is connected via transistor Q10 to capacitor C5. For daylight photography, the output of the holding circuit 4 remains at a low level, and transistor Q10 remains non-conductive, so that transistor Q1 alone provides logarithmic expansion. For flash photography, transistor Q10 becomes conductive to make the transistor Q1' operative. Accordingly, the logarithmic expansion circuit assumes the parallel connection of transistors Q1 and Q1', with the same signal being impressed on the bases of both transistors, so that the total base-emitter junction area is, in effect, increased, whereby an expanded current for the same base input is increased in proportion to an increase in the aforenoted base-emitter junction area. For instance, if the collector current of transistor Q1 remains 800 μA for the input voltage correponding to 1/1000 second of exposure time for daylight photography, the expanded current for the same input voltage must be increased for the flash photography to as high as 64 times that in the case of transistor Q1 alone so that the controlled time may be 1/64000 second. This dictates that the base-emitter junction area of transistor Q1' be 63 times as large as that of the base-emitter junction area of transistor Q1. This circuit arrangement provides an advantage in improved accuracy, as compared with other circuit arrangements, when formed in a semiconductor integrating circuit.

Figure 10:
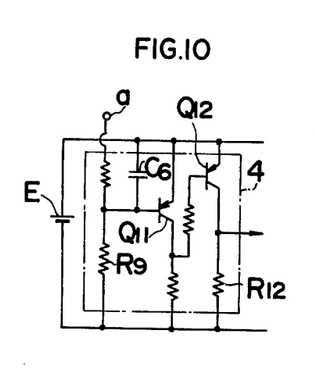
FIG. 10 is a detailed illustration of another embodiment of component 4.

FIG. 10 shows another example of holding circuit 4. A terminal a is to be connected to the output terminal of circuit 6 shown in FIG. 4. The junction between the collector of transistor Q12 and a resistor R12 serves as an output terminal of the holding circuit 4, and is to be connected to the bases of transistors Q2 and Q3 shown in FIG. 5, to the base of transistors Q7 shown in FIG. 7, to the base of transistor Q9 shown in FIG. 8, or to the base of transistor Q10 shown in FIG. 9. First, explanation is provided of the operation for daylight photography. In this case, as terminal a remains at a low level, a transistor Q11 remains conductive to block transistor Q12, and accordingly the output of circuit 4 is maintained at a low level. For flash photography, when main capacitor CM in the flash-firing device (FIG. 4) is charged to a given voltage level, then the output of circuit 6 is built up to a high level, and the potential at terminal a also rises to a high level. Capacitor C6, connected between the base and emitter of transistor Q11, and having been charged, is charged oppositely when terminal a is brought to a high level, so that transistor Q11 is made non-conductive, and transistor Q12 becomes conductive, with the result that the output of circuit 4 is brought to a high level. This condition continues even after the terminal voltage of the main capacitor has been lowered below a given level due to the flash firing, until the base-emitter voltage of transistor Q11, i.e. the voltage across capacitor C6 which is charged via resistor R9 from electric power source E, reaches a level to make transistor Q11 conductive. The period during which the output of circuit 4 is maintained at a high level may be set, as desired, depending on suitable selection among the respective values of capacitor C6 and resistor R9. For instance, if the aforementioned period is set to cover the termination of the entire firing of a flash, the exposure control circuit is automatically changed back to the daylight photography mode after the termination of the entire firing of the flash, and then exposure time control is continued in the daylight mode thereafter, in case an optimum exposure can not be achieved, despite the entire firing of the flash. Thus, when an optimum exposure level is reached, then the shutter is closed.

Figure 11:
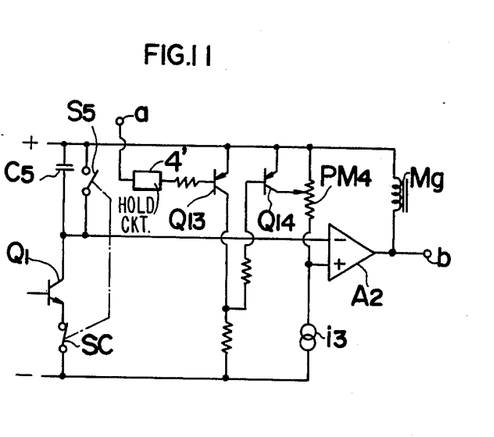
FIG. 11 is a circuit diagram showing a fourth example of the circuit constant changing circuit.

FIG. 11 shows another example of an arrangement for changing over or adjusting the switching characteristics of the control circuit. The arrangement of this Figure is contemplated to change over an inversion level of a switching circuit for initiating the shutter closing operation by controlling magnet Mg. Shown at A2 is a level comparator circuit for providing a switching function, in which a given voltage is impressed on a non-inversion input terminal (designated by the mark +) by means of potentiometer PM4 to provide the inversion level. A constant current flows into potentiometer PM4 from a constant-current circuit i3. The potential of an inversion input terminal (designated by the mark —) of operational amplifier A2 is, at the initial phase, higher than the potential at the non-inversion input terminal, and the output of operational amplifier A2 remains low, so that magnet Mg is energized. An integrating capacitor C5 is connected with a logarithmic expansion transistor Q1. Since the charge voltage of capacitor C5 is impressed between the positive bus line and the inversion input terminal of operational amplifier A2, the potential at the inversion terminal of operational amplfier A2 is lowered as the charging of capacitor C5 proceeds. When the potential at the inversion terminal becomes lower than the potential at the non-inversion input terminal of amplifier A2, then the output of operational amplifier A2 is brought to a high level, thereby deenergizing magnet Mg. A counting switch SC connected to the emitter of transistor Q1, and a discharging switch S5 for capacitor C5 are interlocked with each other to be closed and opened in conjunction with camera shutter release operation. In the case of daylight photography, transistor Q14 connected across a part of the resistance of potentiometer PM4 remains non-conducting, and the level of the non-inversion input terminal of operational amplifier A2 is low. In the case of flash photography, however, an output of the holding circuit 4' is brought to a high level to make transistor Q13 non-conductive, so that transistor Q14 becomes conductive, thereby shortcircuiting that part of the resistance of potentiometer PM4. As the result, a voltage impressed on the non-inversion input terminal of operational amplifier A2 becomes higher than that for daylight photography, so operational amplifier A2 is inverted to de-energize magnet Mg when integrating capacitor C5 is charged to a level lower than that for daylight photography. For instance, assume that the shutter speed is 1/1000 second for an expanded current of 800 $\mu$A in the case of daylight photography, and a flash firing duration is 1/32000 second for the same expanded current of 800 $\mu$A, then the difference in threshold levels for daylight photography and flash photography is 1.936 V, in which case the capacity of capacitor C5 is 0.4 $\mu$F.

While the described embodiment represents the preferred form of the present invention, it is to be understood that modifications will be apparent to those skilled in that art without departing from the spirit of the invention. The scope of the invention is therefore to be described solely by the appended claims.

We claim:

1. A light responsive circuit comprising:
   a photoelectric element;
   a logarithmic compression circuit for generating a first signal proportional to the logarithm of intensity of light incident on said photoelectric element;
   means for generating a second signal;
   means for combining said first and second signals to produce a third signal;
   a logarithmic expansion circuit for generating a fourth signal proportional to the anti-logarithm of said third signal;
   means for shifting the level of said third signal to be applied to said logarithmic expansion circuit;
   a control circuit responsive to said fourth signal;
   means for changing the control characteristic of said control circuit so that said control circuit provides different control characteristics for the same amount of signal applied to said logarithmic expansion circuit; and
   means for actuating said means for shifting and said means for changing.

2. A light responsive circuit as in claim 1 wherein said means for shifting is coupled with said means for generating a second signal to shift the level of said second signal.

3. A light responsive circuit as in claim 1 wherein said control circuit includes an integrating means for integrating said fourth signal, and a detection means for generating a fifth signal when the output of said integrating means reaches a predetermined level.

4. A light responsive circuit as in claim 3 wherein said detection means includes a reference means for generating a reference signal and comparison means for comparing said output of said integrating means with said reference signal.

5. A light responsive circuit as in claim 4 wherein said means for changing is associated with said reference means for changing said reference signal by a predetermined amount.

6. A light responsive circuit as in claim 4 wherein said integrating means includes capacitor means associated with said means for changing so that the capacity of said capacitor means may be changed.

7. A light responsive circuit as in claim 6 wherein said capacitor means includes a pair of capacitors connected in parallel with each other and said means for changing includes a switching member for selectively disconnecting one of said pair of capacitors.

8. A light responsive circuit as in claim 6 wherein said capacitor means includes a pair of capacitors connected in series with each other and said means for changing includes a switching member for selectively short-circuiting one of said capacitors.

9. A light responsive circuit as in claim 3, wherein said logarithmic expansion circuit includes a pair of transistors having their bases and emitters connected with each other, their collectors connected to said integrating means, and said means for changing includes a switching member for selectively disconnecting the collector of one of said transistors from said integrating circuit.

10. A camera exposure and flash control system comprising:
    a photoelectric element for receiving light from an object to be photographed;
    a logarithmic conversion means for generating a first signal proportional to the logarithm of the light received by said photoelectric element;
    an exposure factor signal means for generating a second signal representative of a set exposure factor;
    an exposure calculation means for combining said first and second signals to generate a third signal as a result of an exposure calculation combining said first and second signals;
    a logarithmic expansion circuit for generating a fourth signal proportional to the anti-logarithm of said third signal;
    a shifting means for shifting the level of said third signal to be applied to said logarithmic expansion means;
    a control circuit for generating a control signal in accordance with said fourth signal;
    a changing means for changing the control characteristic of said control circuit to accommodate the latter for the shifted third signal; and
    an actuating means for actuating said shifting means and said changing means.

11. A control system as in claim 10 further comprising a voltage detection means for generating a fifth signal upon detection of the charging of the main capacitor for energizing a flash tube, and a holding circuit for holding said fifth signal, said actuating means being connected to said holding circuit to respond to said fifth signal.

12. A control system as in claim 11 further comprising an electromagnetic means responsive to said control signal and a stop means for interrupting flash firing in response to said control signal.

13. A control system as in claim 11 wherein said control circuit includes a reference means for generating a reference signal, integration means for integrating said fourth signal, and comparison means for generating said control signal in accordance with the comparison of the output of said integration circuit with said reference signal.

14. A control system as in claim 13 wherein said reference means is connected with said changing means so that the reference signal may be changed by said changing means.

15. A control system as in claim 13 wherein said integration means includes a capacitor means associated with said changing means so that its capacity may be changed thereby.

16. A control system as in claim 13 wherein said logarithmic expansion circuit includes a semiconductor means connected with said changing means so that the expanded signal may be changed for the same input to the circuit.

* * * * *